3,345,326
STABILIZED CHLORINATED POLYETHYLENES
CONTAINING BORON COMPOUNDS
Leo S. Chang, Madison, Richard B. Lund, Whippany, Arleen C. Pierce, Parsippany, and Edith Turi, Livingston, N.J., assignors to Allied Chemical Corporation, New York, N.Y., a corporation of New York
No Drawing. Filed Mar. 6, 1964, Ser. No. 350,115
8 Claims. (Cl. 260—45.75)

This invention relates to the stabilization of halogen-containing olefin polymers against the harmful effects of high temperatures, more particularly to new chlorinated polyethylene compositions having good thermal stability.

It is known that halogen-containing olefin polymers such as polyvinyl chloride, chlorinated polyethylene and chlorinated polypropylene are adversely affected when exposed to elevated temperatures either during fabrication or during use. This adverse effect is usually evidenced by an increase in viscosity which is demonstrated by the increased work required to extrude or mix the material. It is generally believed that this change in viscosity is due to splitting hydrogen and/or halogen atoms out of the polymer molecule, resulting in increased crosslinking or gel-formation of the polymer. The outward manifestations of such molecular occurrences include an increase in brittleness, loss of impact strength, deterioration of electrical insulating characteristics, etc.

Many additives have been proposed which increase the thermal stability of specific halogen-containing polyolefins; however, there is no consistency in the effectiveness of these stabilizers when used in different types of halogen-containing polyethylene. For instance, a number of compounds which effectively thermally stabilize vinyl chloride compounds have little or no stabilizing effect on chlorinated polyethylene.

It is an object of the present invention to provide heat stable compositions based upon chlorinated polyethylenes.

Additional objects and advantages of the present invention will become apparent from the following detailed description thereof.

In accordance with the present invention it has been discovered that the thermal stability of chlorinated polyethylenes is improved by the addition thereto of at least one organic boron-containing compound from the following list:

tributyl borate:

$$(C_4H_9O)_3B$$

cadmium tetrapentyl borate:

$$(C_5H_{11}O)_4B^-Cd^+$$

tricresyl borate:

α-(3,5-dimethyl-4-hydroxyphenyl)-α′-[3,5-dimethyl-4-(o-phenylene borato)-phenyl]-2,3,5,6-tetrachloroxylene:

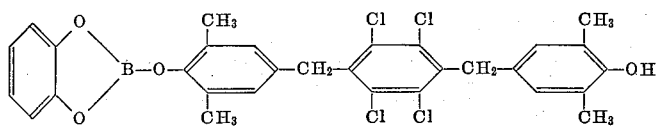

2,6-di-t-butyl-4-methylphenyl dibutyl borate:

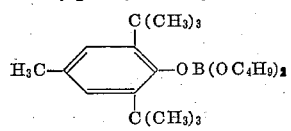

2-(2′-2′-diallyloxymethylbutoxy)-5-allyloxymethyl-5-ethyl-1,3,2-dioxaborinane:

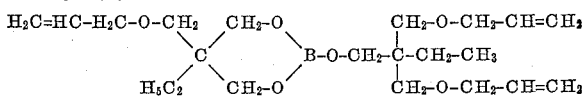

2-(3′,5′-di-t-butyl-4′-hydroxybenzyloxy)-4,4,6-trimethyl-1,3,2-dioxaborinane:

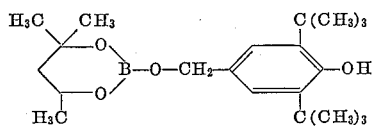

These stabilizers were found to be effective when added to chlorinated polyethylene in amounts equal to at least about 0.5 percent by weight of the polymer, with optimum results being obtained when the stabilizers are added in amounts equal to about 1 to 10 percent by weight of the polymer.

The organic boron-containing compounds which have been found by the present invention to effectively stabilize chlorinated polyethylene are all known compounds except for 2-(2′,2′-diallyloxymethylbutoxy)-5-allyloxymethyl-5-ethyl-1,3,2-dioxaborinane, which can be prepared in accordance with the disclosure in copending application Ser. No. 350,108 for United States Letters Patent entitled, Borinane Compounds, filed concurrently herewith, and α-(3,5-dimethyl-4-hydroxyphenyl)-α′-(3,5-dimethylphenyl)-2,3,5,6-tetrachloroxylene-o-phenylene borate, which can be prepared in accordance with the disclosure in a copending application Ser. No. 350,078 for United States Letters Patent entitled, Borate Compounds, filed concurrently herewith.

The ability of the organic boron-containing compounds of the present invention to stabilize chlorinated polyethylene does not appear to be the result of any mechanism which is presently understood; and other organic boron-containing compounds have been found to have little or no stabilizing effect. Such ineffective compounds include triphenyl borane and triisopropanolamine borate.

The stabilizers can be employed with other common additives used in halogenated polyolefin formulations, such as stabilizers against the effects of radiation, fillers, pigments, and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer, originally entirely soluble in monochlorobenzene, which is no longer soluble after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperatures.

The stabilizer compositions of the invention are applicable to halogen-containing ethylene polymers, especially to chlorinated polyethylenes.

The chlorinated polyethylene stabilized by our invention can contain from about 20 to about 80% by weight chlorine. In a preferred embodiment, the chlorinated polyethylene is randomly chlorinated whereby it is essentially amorphous and has a low brittle point (glass transition temperature), such as 0° C. or lower at 20 percent chlorine content and rising with chlorine content to over 185° C. at 80 percent chlorine content. Particularly suitable polyethylenes to be chlorinated for use in our invention are those produced as described in Example 6 of British Patent No. 858,674, of Jan. 11, 1961. Such polyethylenes can be chlorinated with advantage for use in our invention by the process described in Example 3 of French Patent No. 1,316,044 of Dec. 17, 1962.

The polymerization process of British Patent No. 858,674 results generally in a polymer of high molecular weight such as 500,000 to 5,000,000 average molecular weight, and of density of about 0.935 to 0.96 gm./cm.$^3$ at 25° C. The molecular weight of the polymer can be reduced by a thermal treatment, for instance in accordance with the process outlined at page 12, lines 73–77 of the above-identified British Patent No. 858,674. The molecular weight of the resulting polyethylenes will be in the range of about 20,000 to 300,000, and the density will be about 0.94–0.985 gm./cm.$^3$ at 25° C.

The foregoing molecular weights are calculated from the intrinsic viscosity of a solution of the polymer in decalin, according to the method of P. S. Francis et al. (Journal of Polymer Science, volume 31, pp. 453–466), i.e. by using the following formula:

$$[\eta] = 6.77 \times 10^{-4} \times M^{0.67}$$

where $[\eta]$ is the intrinsic viscosity in deciliters per gram, and M is the average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D-1043-61T), as the temperature below which the stiffness sharply increases so that the sample becomes brittle. A typical stiffness modulus at the glass transition temperature for the subject chlorinated polyethylenes is $1.45 \times 10^4$ p.s.i. (i.e. $10^9$ dynes/cm.$^2$).

One preferred group of randomly chlorinated polyethylenes of chlorine content in the range 20–80 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.1 to about 1.5 deciliters per gram, indicating lower molecular weight of the polymer. These intrinsic viscosities are determined upon a 0.1 gram per 100 ml. solution in o-dichlorobenzene at 100° C.

The following examples describe completely specific embodiments of our invention and illustrate the best mode contemplated by us of carrying out our invention; but are not to be interpreted as limiting the invention to all details of the examples.

The samples tested consisted of unstabilized controls and compositions containing stabilizer in an amount equal to 4% by weight of the weight of the chlorinated polyethylene. In all tests the chlorinated polyethylene sample was ground to about −40 mesh powder. Solutions of the stabilizers in volatile solvents, such as methanol, were used to facilitate blending of the stabilizers with the polymer. These solutions were added to the samples of powdered polymer and the mixtures were stirred under $N_2$ at ambient temperatures, until completely dried.

About 2–3 grams of each prepared sample were heated in open test tubes in a block heater at 200° C. for 60 minutes, except where specified otherwise. This heat treatment of the sample resulted in the thermal breakdown of the polymer into a certain percentage of a crosslinked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken as 100% whiteness.

The amount of crosslinked product or gel formed as a result of the heat treatment was determined in accordance with the following procedure:

About 0.2 to 0.3 gram of the heat treated polymer was weighed into a tared stainless steel basket made of 250 mesh screen. This basket was placed into a Soxhlet extractor containing approximately 125 ml. monochlorobenzene, and refluxed for six hours. The noncrosslinked product was extracted, permitting gravimetric determination of the crosslinked gel. During the extraction the system was kept under slow $N_2$ stream to oprevent oxidation.

Another method of demonstrating the effectiveness of the stabilizers, as shown in Example 9, is to determine the length of time during which polymers containing the stabilizers remain unchanged while being subjected to shear forces in a Brabender Plastograph at an elevated temperature. Changes in stability of the resin are shown by a variation in the torque as recorded by the instrument. This test is a good simulation of actual processing conditions such as are encountered in Banbury mills, rolls and extruders and gives an indication of the length of time during which the polymer is processable.

*Examples 1–8*

Table I shows the results obtained by incorporating the respective stabilizers into a high molecular weight chlorinated polyethylene produced in accordance with Example 6 of British Patent No. 858,674 above cited for the polyethylene, and Example 3 of French Patent No. 1,316,044 above cited for the chlorination; and having a chlorine content of 60.1 percent by weight, an intrinsic viscosity of 4.2 and a glass transition temperature of about 73° C.

TABLE I

| Test | Stabilizer | Percent Whiteness | Percent Gel |
| --- | --- | --- | --- |
| Control A | Unstabilized resin | 12 | 34 |
| Example 1 | Tri-n-butyl borate | 16 | 5 |
| Example 2 | Tri-m,p-cresyl borate (a mixture of both) | 16 | 2 |
| Example 3 | 2-(3′,5′-di-t-butyl-4′-hydroxy-benzyloxy)4,4,6-trimethyl-1,3,2-dioxaborinane. | 7 | 0 |
| Control B | Triisopropanolamine borate | 3 | 84 |

The last member of Table I, Control B, is shown to demonstrate that the stabilizing efficacy of a compound similar to other compounds, which were found to be good stabilizers, is quite unpredictable.

In Table II comparative test results are shown wherein a number of stabilizers have been incorporated in a reduced molecular weight polyethylene having a chlorine content of 59.0 percent by weight and an intrinsic viscosity of 0.7 and essentially random chlorine substitution, with a glass transition temperature of about 60° C.

TABLE II

| Test | Stabilizer | Percent Whiteness | Percent Gel |
|---|---|---|---|
| Control C | Unstabilized resin | 12 | 11 |
| Example 4 | Cadmium tetra-n-pentyl borate. | 10 | 4 |
| Example 5 | 2-(2'-2'-diallyloxymethyl-butoxy)-5-allyloxymethyl-5-ethyl-1,3,2-dioxaborinane. | 13 | 1 |
| Example 6 | α-(3,5-dimethyl-4-hydroxyphenyl)-α'-[3,5-dimethyl-4-(o-phenylene borato)-phenyl]-2,3,5,6-tetrachloroxylene. | 10 | 3 |
| Control D | Triphenylborane | 9 | 37 |

The last compound in Table II, Control D, is included to demonstrate that the stabilizing efficacy of a compound similar to other compounds, which were found to be good stabilizers, is quite unpredictable.

In Table III comparative test results are summarized, using a reduced molecular weight chlorinated polyethylene containing 67.3 percent by weight chlorine and having an intrinsic viscosity of 0.7 and a glass transition temperature of about 115° C. Heat treatment was conducted at 230° C. for 30 minutes.

TABLE III

| Test | Stabilizer | Percent Whiteness | Percent Gel |
|---|---|---|---|
| Control E | Unstabilized resin | 4 | 16 |
| Example 7 | Cadmium tetra-n-pentyl borate. | 10 | 5 |
| Example 8 | 2,6-di-t-butyl-4-methylphenyl di-n-butyl borate. | 7 | 0 |

*Example 9*

100 grams chlorinated polyethylene having a chlorine content of 68 percent by weight and an intrinsic viscosity of 0.7 were mixed with 4 grams of the diglycidyl ether of Bisphenol A, a commercial epoxy stabilizer (bis-(1,2-epoxypropyloxy - 4 - hydroxyphenyl)-2-propane). A 16 gram charge of the resulting mixture was worked in a C. W. Brabender Plastograph at 30 r.p.m. and 220° C. The stability time of the mixture under these conditions was 3 minutes.

The above procedure was then repeated using 4 grams of 2,6-di-t-butyl-4-methylphenyl di-n-butyl borate as the stabilizer. The stability time in the Brabender Plastograph at 30 r.p.m. and 220° C. was 22 minutes.

We claim:
1. A composition comprising a chlorinated polyethylene, and a stabilizing amount of about 0.5 to 10 percent by weight of the chlorinated polyethylene of an organic boron-containing member of the group consisting of 2-(2',2' - diallyloxymethylbutoxy) - 5 - allyloxymethyl - 5-ethyl-1,3,2-dioxaborinane; cadmium tetrapentyl borate; α - (3,5 - dimethyl-4-hydroxyphenyl-α'-[3,5-dimethyl-4-(o - phenylene borato)-phenyl]-2,3,5,6-tetrachloroxylene and 2 - (3',5'-di-t-butyl-4'-hydroxybenzyloxy)-4,4,6-trimethyl-1,3,2-dioxaborinane.

2. The composition of claim 1, wherein said chlorinated polyethylene has a chlorine content of about 20–80%.

3. The composition of claim 2, wherein said chlorinated polyethylene is a high molecular weight polymer with random chlorination, having an intrinsic viscosity in the range between 1.5 and 5 deciliters per gram, as measured in o-dichlorobenzene at 100° C.

4. The composition of claim 2, wherein said chlorinated polyethylene has an intrinsic viscosity in the range between 0.1 and 1.5 deciliters per gram, as measured in o-dichlorobenzene at 100° C.

5. The composition of claim 1, wherein said organic boron-containing compound is 2-(2',2'-diallyloxymethyl-butoxy)-5-allyloxymethyl-5-ethyl-1,3,2-dioxaborinane.

6. The composition of claim 1, wherein said organic boron-containing compound is cadmium tetra-n-pentyl borate.

7. The composition of claim 1, wherein said organic boron-containing compound is α'-[3,5 - dimethyl - 4 - (o-phenylene borato)-phenyl]-2,3,5,6-tetrachloroxylene.

8. The composition of claim 1, wherein said organic boron-containing compound is 2-(3',5'-di-t-butyl-4'-hydroxybenzyloxy)-4,6-trimethyl-1,3,2-dioxaborinane.

References Cited

UNITED STATES PATENTS

| 3,082,192 | 3/1963 | Kirshenbaum et al. | 260—45.7 |
| 3,131,164 | 4/1964 | Doyle et al. | 260—45.7 |
| 3,196,129 | 7/1965 | Hechenbleickner et al. | 260—45.75 |
| 3,242,135 | 3/1965 | Bown et al. | 260—45.85 |
| 3,244,662 | 4/1966 | Strauss et al. | 260—45.7 |

FOREIGN PATENTS 1,149,527  5/1963  Germany.

DONALD E. CZAJA, *Primary Examiner.*

LEON J. BERCOVITZ, *Examiner.*

G. W. RAUCHFUSS, V. P. HOKE, *Assistant Examiners.*

UNITED STATES PATENT OFFICE
CERTIFICATE OF CORRECTION

Patent No. 3,345,326                        October 3, 1967

Leo S. Chang et al.

It is hereby certified that error appears in the above numbered patent requiring correction and that the said Letters Patent should read as corrected below.

Column 4, line 23, for "oprevent" read -- prevent --; column 6, lines 31 and 32, strike out "α′-[3,5-dimethyl-4-(o-phenylene borato)" and insert instead -- α-(3,5-dimethyl-4-hydroxyphenyl)-α′-[3,5-dimethyl-4-(o-phenylene borato) --.

Signed and sealed this 8th day of October 1968.

(SEAL)
Attest:

Edward M. Fletcher, Jr.                        EDWARD J. BRENNER
Attesting Officer                                Commissioner of Patents